(12) United States Patent
Liu et al.

(10) Patent No.: US 9,293,263 B2
(45) Date of Patent: Mar. 22, 2016

(54) SOLID ELECTROLYTIC CAPACITOR

(71) Applicants: Kemet Electronics Corporation, Simpsonville, SC (US); NEC TOKIN CORPORATION, Miyagi (JP)

(72) Inventors: Yanming Liu, Simpsonville, SC (US); Yuji Yoshida, Miyagi (JP); Hayato Ueda, Miyagi (JP); Daisuke Takada, Miyagi (JP); Satoshi Iwai, Miyagi (JP); Takashi Mizukoshi, Miyagi (JP)

(73) Assignees: KEMET Electronics Corporation, Simpsonville, SC (US); NEC Tokin Corporation, Miyagi (JP)

( * ) Notice: Subject to any disclaimer, the term of this patent is extended or adjusted under 35 U.S.C. 154(b) by 170 days.

(21) Appl. No.: 14/167,461

(22) Filed: Jan. 29, 2014

(65) Prior Publication Data
US 2015/0213961 A1 Jul. 30, 2015

(51) Int. Cl.
*H01G 9/012* (2006.01)
*H01G 9/15* (2006.01)
*H01G 9/10* (2006.01)

(52) U.S. Cl.
CPC ............. *H01G 9/012* (2013.01); *H01G 9/10* (2013.01); *H01G 9/15* (2013.01); *Y10T 29/417* (2015.01)

(58) Field of Classification Search
CPC ............ H01G 9/012; H01G 9/10; H01G 9/15
USPC ................. 361/516–519, 523–525, 528–529, 361/535–536, 540–541
See application file for complete search history.

(56) References Cited

U.S. PATENT DOCUMENTS

| 6,236,561 | B1 * | 5/2001 | Ogino | H01G 9/012 361/301.3 |
|---|---|---|---|---|
| 7,057,882 | B2 * | 6/2006 | Fujii | H01G 9/012 361/528 |
| 7,277,271 | B2 * | 10/2007 | Yamaguchi | H01G 2/065 29/25.01 |
| 7,292,432 | B2 | 11/2007 | Furuzawa et al. | |
| 8,432,665 | B2 | 4/2013 | Umemoto et al. | |
| 8,437,117 | B2 * | 5/2013 | Umemoto | H01G 9/012 361/528 |
| 8,753,409 | B2 * | 6/2014 | Miyachi | H01G 9/012 29/25.03 |

FOREIGN PATENT DOCUMENTS

| JP | H111999-288848 | 10/1999 |
|---|---|---|
| JP | 2000-208367 | 7/2000 |

* cited by examiner

*Primary Examiner* — Nguyen T Ha
(74) *Attorney, Agent, or Firm* — Joseph T. Guy; Perkins Law Firm, LLC

(57) ABSTRACT

An outer insulation member made of a first resin packs a part of an anode terminal. The packed part of the anode terminal has a predetermined section. All surfaces of the predetermined section consist of a front surface, a back surface and edges connecting between the front surface and the back surface. The front surface includes a connection area. An anode lead wire is connected to the connection area while being not connected to the anode terminal other than the connection area. The all surfaces of the predetermined section are completely covered with a mask layer made of a second resin except for the connection area. The second resin is different from the first resin in at least one of composition thereof, content of an inclusion, size of an inclusion and shape of an inclusion.

22 Claims, 5 Drawing Sheets

SOLID ELECTROLYTIC CAPACITOR

BACKGROUND OF THE INVENTION

This invention relates to a solid electrolytic capacitor that has high humidity resistance.

For example, a solid electrolytic capacitor is disclosed in JP2000-208367A, which is incorporated herein by reference. The disclosed solid electrolytic capacitor includes an anode body coated with a dielectric film, a solid electrolyte layer formed on the dielectric film, a cathode layer formed on the solid electrolyte layer, a cathode lead, an anode lead wire attached to or partially embedded in the anode body, an anode terminal connected to the anode lead wire, and an outer insulation member encasing all but a portion of the anode and cathode leads. The anode lead wire and the anode terminal may be connected to each other before the formation of the solid electrolyte layer. The connection portion between the anode lead wire and the anode terminal is covered with and fixed by resin, which is formed in a process different from the formation process of the outer insulation member. According to JP2000-208367A, since the anode lead wire and the anode terminal are connected before the formation of the solid electrolyte layer, the solid electrolyte layer can be prevented from being damaged by stress upon the connection between the anode lead wire and the anode terminal.

The solid electrolytic capacitor of JP2000-208367A as well as other conventional solid electrolytic capacitors might be broken down when used under high humidity atmosphere.

SUMMARY OF THE INVENTION

It is therefore an object of the present invention to provide a solid electrolytic capacitor that has high humidity resistance.

As a result of humidity test for solid electrolytic capacitor, the present inventors have found out that one cause of property deterioration of a solid electrolytic capacitor is metal ions eluting from an anode terminal. For example, an anode terminal is formed of a copper plate plated with nickel and/or tin. Contact of water on such an anode terminal generates metal ions, which might migrate towards a cathode layer together with penetration of water. If the metal ions reach a solid electrolyte layer and a dielectric film of a capacitor element, equivalent series resistance (ESR) of the solid electrolyte layer becomes large, and leak current through the dielectric film increases. Therefore, it is preferable that the anode terminal be prevented from being in contact with water. In particular, if metal ions elute from a section of the anode terminal close to the capacitor element, the above-described problems will happen easily because an assumed path length of migration of metal ions is short. The present inventors have identified, as a predetermined section, a section relating to the generation of problematic metal ions and have found that the outer insulation member is not sufficient to prevent generation of metal ions from the predetermined section. Therefore, the present inventors have considered that the predetermined section is intentionally covered with a resin prior to the formation process of the outer insulation member. Based on the above findings and consideration, the present invention provides an improved solid electrolytic capacitor as further described herein.

One aspect of the present invention provides a solid electrolytic capacitor which comprises a capacitor element, a cathode terminal, an outer insulation member and an anode terminal. The capacitor element includes an anode body, an anode lead wire and a cathode layer. The anode lead wire extends from the anode body. The cathode terminal is connected to the cathode layer. The outer insulation member is made of a first resin. The outer insulation member encases the capacitor element and a part of the cathode terminal. A part of the anode terminal is also encased by the outer insulation member. The part of the anode terminal has a predetermined section, all surfaces of the predetermined section consisting of a front surface, a back surface and edges connecting between the front surface and the back surface. The front surface includes a connection area. The anode lead wire is connected to the connection area while the anode lead wire is not connected to the anode terminal other than the connection area. All surfaces of the predetermined section are completely covered with a mask layer made of a second resin except for the connection area. The first resin and the second resin are different from each other in at least one of composition thereof, contents of inclusions, sizes of inclusions and shapes of inclusions.

In the predetermined section, areas other than the connection area are completely covered with the mask layer made of the second resin, while the connection area is hid by the connection with the anode lead wire so as not to be exposed. The outer insulation member is made of the first resin. The first resin and the second resin are different from each other in at least one of composition thereof, contents of inclusions, sizes of inclusions and shapes of inclusions. In short, the predetermined section is intentionally covered with the second resin of the mask layer which is distinguishable from the first resin of the outer insulation member. Therefore, generation of metal ions from the predetermined section can be suppressed so that property deterioration of a solid electrolytic capacitor due to metal ion migration can be reduced.

An appreciation of the objectives of the present invention and a more complete understanding of its structure may be had by studying the following description of the preferred embodiment and by referring to the accompanying drawings.

Figure 1:
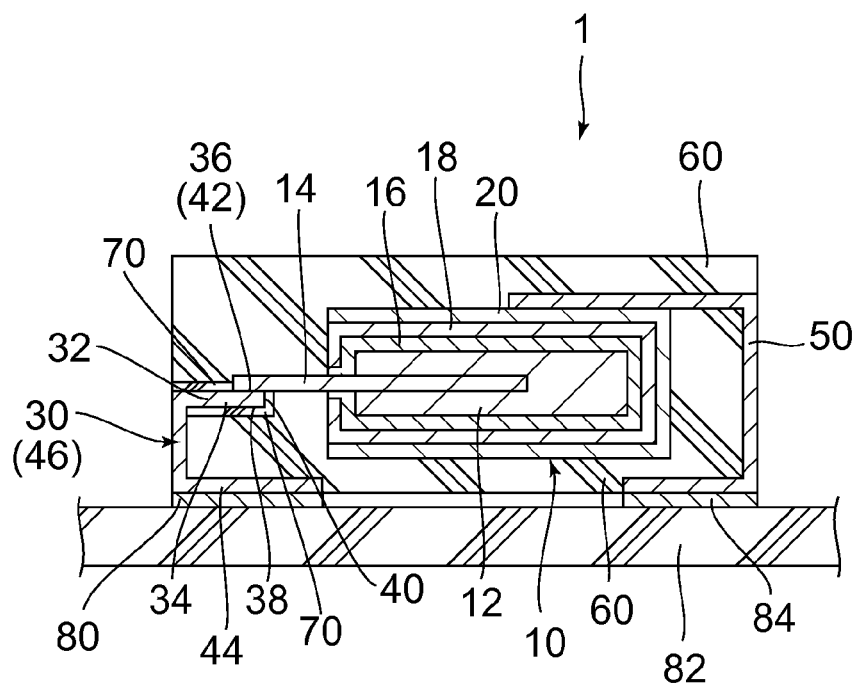
FIG. 1 is a cross-sectional view showing a solid electrolytic capacitor in accordance with an embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all embodiments, equivalents and alternatives falling within the spirit and scope of the present invention as defined by the appended claims.

DETAILED DESCRIPTION

The present invention is related to an improved capacitor. More specifically, the present invention is related to an improved capacitor with a portion of the anode lead encased to prohibit migration of metal particles.

The invention will be described with reference to the figures which are an integral, but non-limiting part of the specification. Throughout the various figures similar elements will be numbered accordingly.

Figure 2:
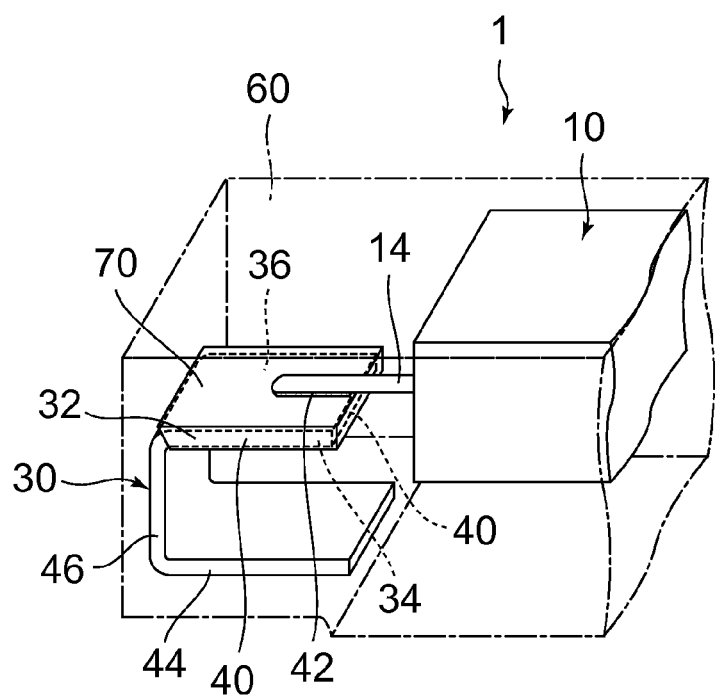
FIG. 2 is a transparent perspective view showing parts of the solid electrolytic capacitor of FIG. 1.

With reference to FIGS. 1 and 2, a solid electrolytic capacitor 1 according to an embodiment of the present invention comprises a capacitor element 10, an anode terminal 30, a cathode terminal 50, an outer insulation member 60 made of a first resin and a mask layer 70 made of a second resin, wherein the mask layer 70 partially covers the anode terminal 30. As shown in FIG. 1, the capacitor element 10 comprises an anode body 12 with a dielectric 16 thereon, an anode lead wire 14, a solid electrolyte layer 18, and a conductive layer 20 preferably comprising at least one of a graphite layer and a silver paste layer. The conductive layer allows for adhesion to the solid electrolyte layer which is otherwise difficult to attach a cathode lead thereto. In use the anode terminal, 30, is in electrical contact with an anode trace 80 of a circuit board 82 and the cathode is in electrical contact with a cathode trace 84 of the circuit board.

The anode body 12 of the present embodiment is preferably formed of a valve metal or a conductive oxide of a valve metal. Sintered tantalum powder is suitable for demonstration of the invention. On the surface of the anode body 12, a dielectric film 16 is formed. The anode lead wire 14 extends from the anode body 12. The anode wire may be the same composition as the anode, which is preferred, or another conductive material. A tantalum wire is suitable for demonstration of the invention when the anode is tantalum. In one embodiment, the anode lead wire 14 is partially embedded in the anode powder, and the anode powder is then press-molded so that a molded member is obtained. Subsequently, the molded member is sintered, such as at 1200° C., so that the anode body 12 of the sintered anode power is obtained. Thereafter, the anode body 12 of the sintered anode power is soaked into an aqueous solution such as a phosphoric acid solution to be anodized so that an anodic oxide film, or the dielectric film, is formed on the surface of the anode body 12 and, in some embodiments, the surface of the anode lead wire 14.

The anode body 12 is alternately soaked into a liquid of thiophene and an oxidizer so that a chemical polymerization is repeatedly carried out to form the solid electrolyte layer 18 of polythiophene on the dielectric film 16. Namely, the solid electrolyte layer 18 of the present embodiment is made of conductive polymer. Other polymers such as polyaniline and polypyrrole are suitable for demonstration of the invention with polythiophene, and particularly poly(ethylene 3,4-dioxythiophene) as described in U.S. Pat. No. 7,667,954 which is incorporated herein by reference, being preferred. A conductive layer 20 is preferably formed to improved adhesion to the solid electrolyte layer. The conductive layer 20 preferably comprises a graphite layer formed on the solid electrolyte layer and a silver paste layer formed on the graphite layer so that the capacitor element 10 is obtained. In other words, a cathode layer of the capacitor element 10 of the present embodiment is made of the solid electrolyte layer 18 and the conductive layer wherein the conductive layer may comprise a graphite layer and the silver paste layer. However, the cathode layer of the capacitor element 10 is not limited thereto. In some embodiments the silver paste layer may be omitted.

The composition of the anode terminal 30 and the cathode terminal 50 is not particularly limited herein. A base member of copper frame plated with nickel and tin is particularly suitable for demonstration of the invention. A nickel plated layer having a thickness of about 1 µm formed on a copper frame base member having a thickness of about 30 µm, and a tin plated layer having a thickness of about 2 µm formed on the nickel plated layer is particularly suitable as an anode or cathode terminal for demonstration of the invention. Thus, the anode terminal 30 and the cathode terminal 50 are obtained. The anode lead wire 14 is preferably welded to the anode terminal 30 such as through resistance welding or other techniques known in the art so that the anode lead wire 14 is connected to a connection area 42 of the anode terminal 30. The anode lead wire 14 is not connected to areas other than the connection area 42. The cathode terminal 50 is preferably bonded to the conductive layer 20 by using a conductive adhesive agent. The conductive adhesive agent made include silver fillers and epoxy resin or other conductive adhesives and related layers as known in the art.

The second resin is applied to a part of the anode terminal 30 to form the mask layer 70. In one embodiment, the second resin of the present embodiment is made of silicone. Namely, the mask layer 70 of the present embodiment comprises silicone without limit thereto. The second resin may include, as its base, fluoroplastic, epoxy resin, acrylic resin, propylene resin or ester resin. The second resin may be formed by mixing a water repellent and a paint made of any resin and may include a water repellent as an inclusion.

The mask layer 70 of the present embodiment preferably has a contact angle of water droplets of not smaller than 80 degrees in order to suppress problematic metal ion generation. The contact angle of water droplets can be measured via a method defined by ISO 15989. In view of reliable prevention of problematic metal ion generation, it is preferable that the mask layer 70 has a contact angle of water droplets of not smaller than 85 degrees. In order to ensure a water repellent ability of the mask layer 70, it is further preferable that the mask layer 70 has a contact angle of water droplets not smaller than 90 degrees. It is still further preferable that the mask layer 70 has not only water-repellent function but also waterproof function and water resistant function.

In the present embodiment, an area where the second resin is applied, or an area where the mask layer 70 is formed, is a first portion 32 of the anode terminal 30 which may occupy one third of the whole region of the anode terminal 30. However, since the anode lead wire 14 is connected to the connection area 42, the connection area 42 is not applied with the second resin. Namely, the mask layer 70 does not directly cover the connection area 42. Thus, the second resin is applied to the entire first portion 32 other than the connection area 42. In other words, the first portion 32 is completely covered with the mask layer 70 and the anode lead wire 14.

The outer insulation member 60 is formed so as to enclose a part of the anode terminal 30 and a part of the cathode terminal 50 and encase the entire capacitor element 10. In one embodiment the outer insulation member 60 is made of epoxy resin formed by injection molding with a metal mold of a predetermined shape, followed by hardening it. The first resin and the second resin are different from each other in at least one of composition, contents of inclusions, sizes of inclusions and shapes of inclusions. For example, the first resin of the present embodiment may include a silica filler as an inclusion in order to lower thermal coefficient of expansion of the outer insulation member 60 and is different from the second resin of the present embodiment. Therefore, the first resin and the second resin are distinguishable from each other. For example, a boundary between the mask layer 70 and the outer insulation member 60 can be identified by scanning electron microscopy (SEM).

The thus-formed outer insulation member 60 encloses the part of the anode terminal, which is the first portion 32. A bottom of the outer insulation member 60 may be fixed to a circuit board when the solid electrolytic capacitor 1 is mounted on the circuit board. Namely, the bottom of the outer insulation member 60 can be a mount surface of the solid electrolytic capacitor 1. After the formation of the outer insulation member 60, each of the anode terminal 30 and the cathode terminal 50 is folded to the bottom of the outer insulation member 60 to have an angular C-shape. Thus, the solid electrolytic capacitor 1 is obtained. The anode terminal 30 of the angular C-shape has a second portion 44 and a coupling portion 46 in addition to the aforementioned first portion 32. The first portion 32 is covered by the outer insulation member 60. The second portion 44 may be exposed on the mount surface of the solid electrolytic capacitor 1, or the bottom of the outer insulation member 60. The coupling portion 46 couples the first portion 32 and the second portion 44 with each other and may be exposed on the side of the outer insulation member 60.

As shown in FIG. 2, the first portion 32 includes a predetermined section 34, as described afterwards. The predetermined section 34 includes the connection area 42. In detail, all surfaces of the predetermined section 34 consists of a front surface 36, a back surface 38 and all edges 40 connecting between the front surface 36 the back surface 38. The connection area 42 is located within or on the front surface 36. As apparent from FIG. 2, all surfaces of the predetermined section 34 are completely covered with the mask layer 70 except for the connection area 42. Specifically, as shown in FIG. 2, the first portion 32 is completely covered with the mask layer 70 except for the connection area 42. Therefore, it can be prevented that water contacts onto the first portion 32 and therefore can not cause metal ions to be eluted from the first portion 32 or to move towards the capacitor element 10.

Thus, the solid electrolytic capacitor 1 of the present embodiment can prevent metal ions from migrating from the anode terminal 30 to the solid electrolyte layer 16 of the capacitor element 10.

Although the first portion 32 is preferably wholly applied with the second resin to form the mask layer 70 in the above-described embodiment, the present invention is not limited thereto. Provided that the mask layer 70 of the second resin completely covers all surfaces of the predetermined section 34 except for the connection area 42, the mask layer 70 may cover other sections.

Figure 3:
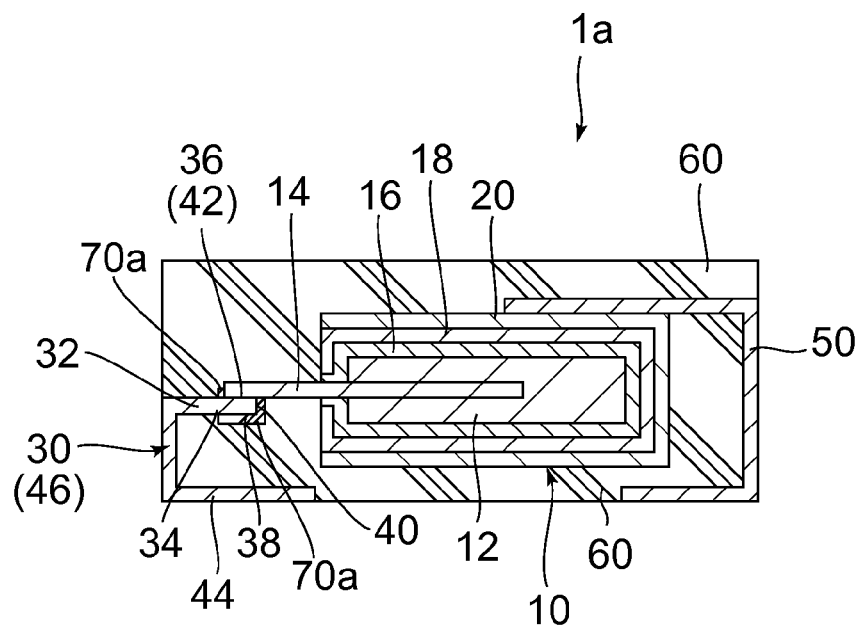
FIG. 3 is a cross-sectional view showing a solid electrolytic capacitor of an embodiment of the invention.
Figure 4:
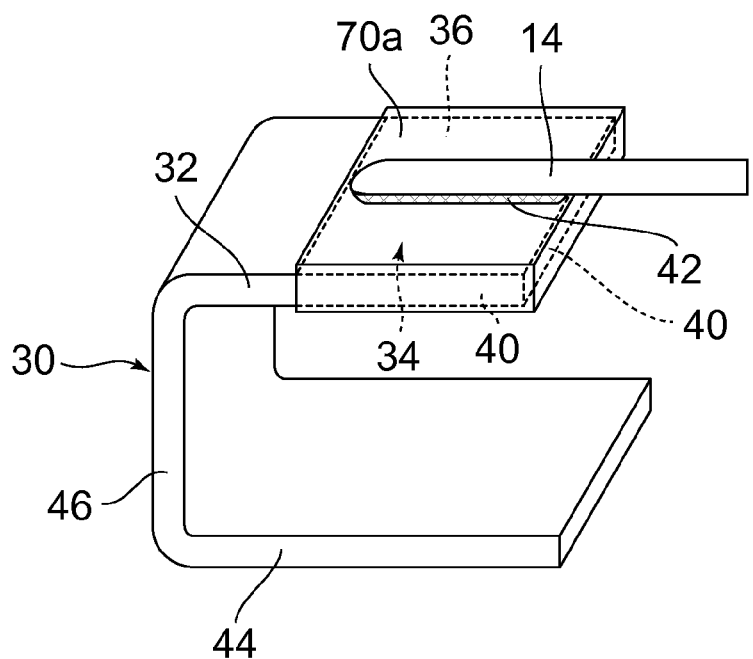
FIG. 4 is a perspective view showing an anode terminal and an anode lead wire of the solid electrolytic capacitor of FIG. 3 shown in isolated view.

A solid electrolytic capacitor 1a is illustrated in FIGS. 3 and 4. In FIGS. 3 and 4, a second resin is not applied for the whole first portion 32 but only for the predetermined section 34. Specifically, in the first modification, all surfaces of the predetermined section 34, i.e., the front surface 36, the back surface 38 and all edges 40 relating to the predetermined section 34, are completely covered with the mask layer 70a except for the connection area 42. Thus, parts of the first portion 32 close to the capacitor element 10 are covered with the mask layer 70a. Therefore, it can be prevented that water contacts on the predetermined section 34 and, accordingly, causes metal ions to be eluted from the predetermined section 34 and to move towards the capacitor element 10.

Figure 5:
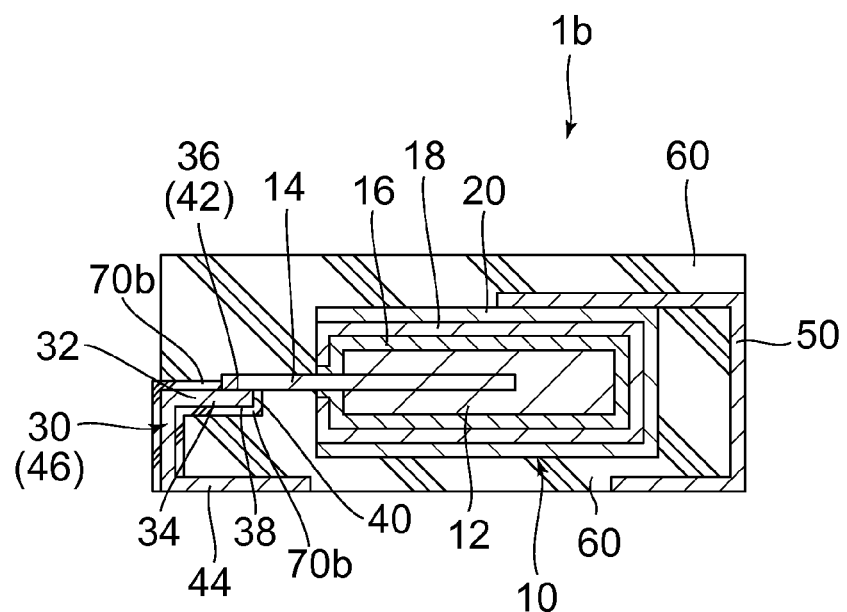
FIG. 5 is a cross-sectional view showing a solid electrolytic capacitor of an embodiment.

In FIG. 5, a second resin is wholly applied for the first portion 32 and the coupling portion 46. Specifically, all surfaces of the first portion 32 and the coupling portion 46, which include those edges as a matter of course, are completely covered with the mask layer 70b except for the connection area 42. Therefore, it can be prevented that water contacts on the first portion 32 thereby inhibiting metal ions from being eluted from the first portion 32 and moving towards the capacitor element 10. In addition, since the coupling portion 46 is positioned outside of the outer insulation member 60 but is protected by the mask layer 70b metal ion elution from the coupling portion 46 is inhibited. Although the entire coupling portion 46 is covered with the mask layer 70b in the second modification, the present invention is not limited thereto. If the coupling portion 46 is, at least in part, covered with the mask layer 70b, results can be obtained in correspondence with the covered areas.

Figure 6:
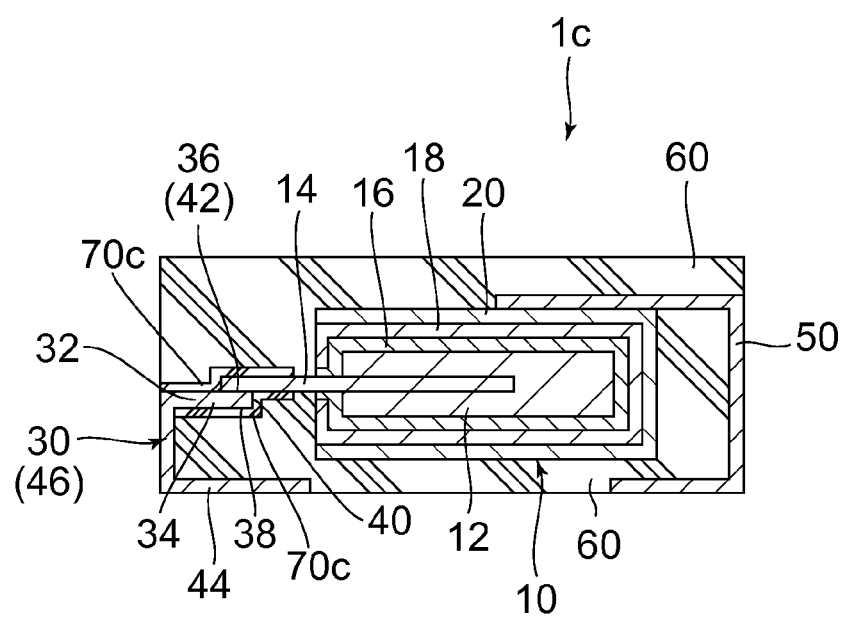
FIG. 6 is a cross-sectional view showing a solid electrolytic capacitor of an embodiment.

In FIG. 6, a second resin is applied for the whole first portion 32 and for a part of the anode lead wire 14. Specifically, the second resin is applied so as to completely cover a part of the anode lead wire 14 close to the connection area 42. Thus, a connection portion between the anode lead wire 14 and the anode terminal 30 is completely covered, preferably completely, with the mask layer 70c. Therefore, it can be prevented that metal ions are eluted from the first portion 32. In addition, even if metal ions are eluted, movement of the metal ions on the anode lead wire 14 can be reduced.

Figure 7:
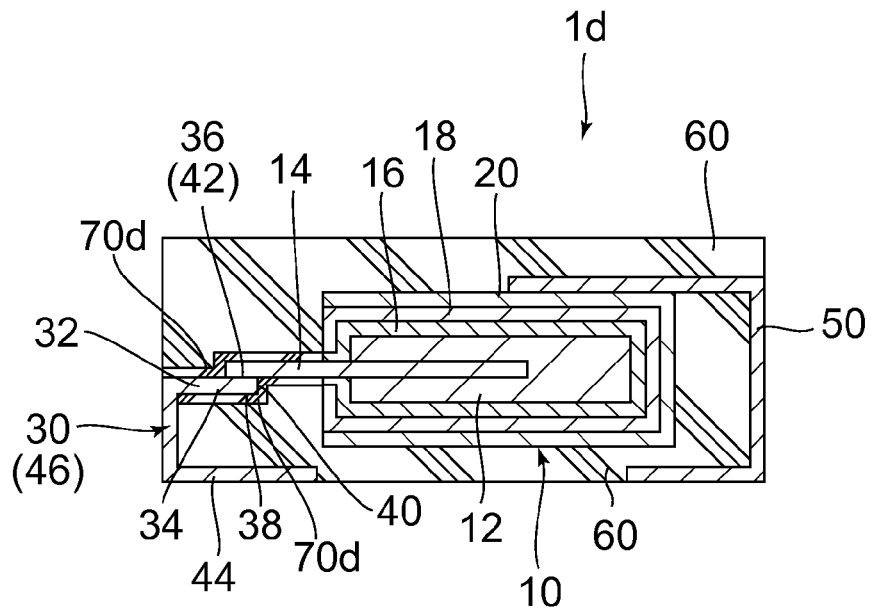
FIG. 7 is a cross-sectional view showing a solid electrolytic capacitor of an embodiment.

In FIG. 7, a second resin is applied for the entire first portion 32 and for the entire anode lead wire 14. Thus, the anode lead wire 14 and the first portion 32 are completely covered with the mask layer 70d. Therefore, it can be prevented that metal ions are eluted from the first portion 32. In addition, even if metal ions are eluted, the eluted metal ions can be prevented from moving on the anode lead wire 14.

Figure 8:
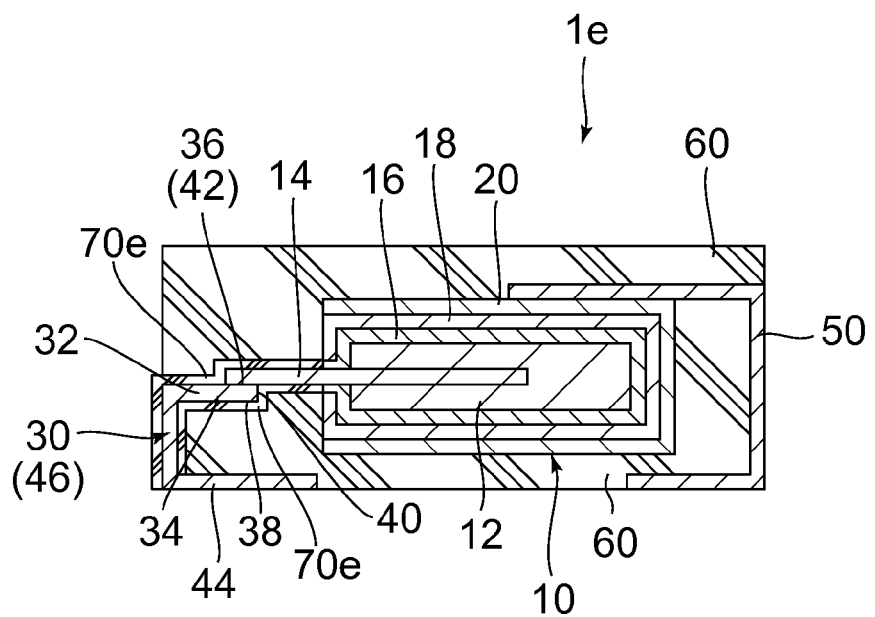
FIG. 8 is a cross-sectional view showing a solid electrolytic capacitor of an embodiment.

In FIG. 8, a second resin of a mask layer 70e is wholly applied for the first portion 32 and the coupling portion 46 and is also applied for the entire anode lead wire 14.

Figure 9:
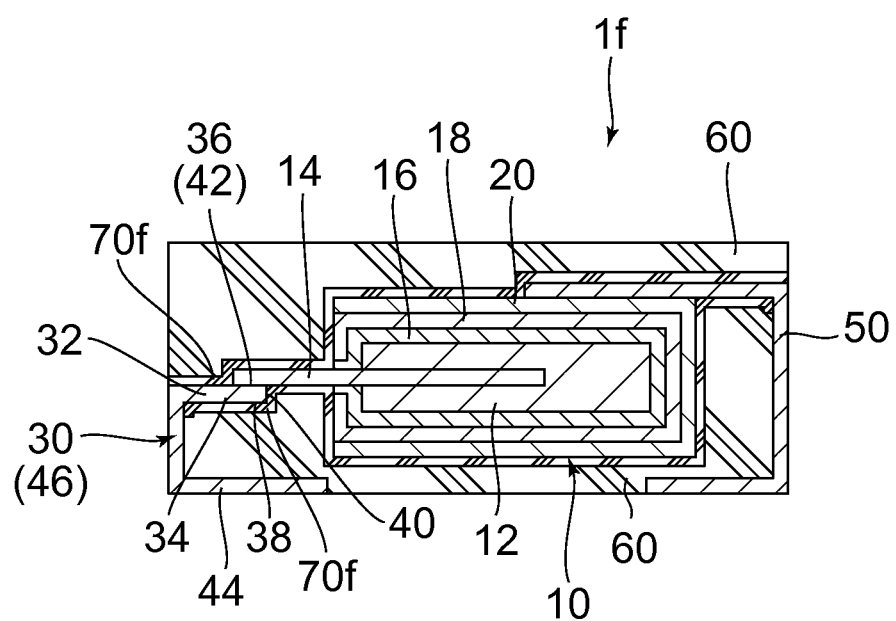
FIG. 9 is a cross-sectional view showing a solid electrolytic capacitor of an embodiment.

A solid electrolytic capacitor 1f is shown in FIG. 9 wherein a second resin of a mask layer 70f is applied for the entire capacitor element 10 and for parts of the anode terminal 30 and the cathode terminal 50 enclosed by the outer insulation member 60. Specifically, the second resin of the mask layer 70f is wholly applied for the first portion 32 of the anode terminal 30 and is wholly applied for a part of the cathode terminal 50, which corresponds to the first portion 32. If portions other than the predetermined section 34 are, at least in part, covered with the mask layer 70f, results can be obtained in correspondence with the covered areas. However, if the mask layer 70f is formed so as to enclose a part of the anode terminal 30 and a part of the cathode terminal 50 and to completely package the capacitor element 10 as shown in FIG. 9, an elution source of metal ions can be completely shut down. In addition, even if metal ions are eluted, movement paths of the eluted metal ions to the capacitor element 10 are completely blocked.

Although each of the mask layers 70 to 70f of the above-described embodiments are formed on the predetermined section 34 and so on by application of the second resins, the present invention is not limited thereto. Methods other than application of a second resin may be used to form a mask layer on the predetermined section 34 and so on. For example, in the case of the solid electrolytic capacitor if the capacitor element 10 and so on may be dipped into the second resin so that the mask layer 70f encloses a part of the anode terminal 30 and a part of the cathode terminal 50 and completely encases the capacitor element 10. However, in case of the dipping process, the entire cathode terminal 50 is temporarily covered with the second resin, the undesired section of second resin must be removed by sand-blasting or wet-blasting in a subsequent process. Therefore, it is preferable that the mask layer is formed by application of the second resin in order to prevent the number of processes from increasing. In one embodiment the mask layer may be formed by other methods such as spraying or coating.

The anode is a conductor and preferably a valve metal or conductive oxide of a valve metal. Particularly preferred valve metals include Al, W, Ta, Nb, Ti, Zr and Hf. Most preferably, the anode comprises at least one material selected from the group consisting of Al, Ta, Nb and NbO with tantalum being most preferred.

The anode wire is a conductor and preferably a valve metal or conductive oxide of a valve metal. Particularly preferred valve metals include Al, W, Ta, Nb, Ti, Zr and Hf. Most preferably, the anode comprises at least one material selected from the group consisting of Al, Ta, Nb and NbO with tantalum being most preferred. In one embodiment the anode wire has the same composition as the anode.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A solid electrolytic capacitor comprising:
a capacitor element including an anode body, an anode lead wire extending from said anode body and a cathode layer;
a cathode terminal connected to said cathode layer;
an outer insulation member comprising a first resin, wherein said outer insulation member encases said capacitor element and a portion of said cathode terminal; and
an anode terminal, a portion of which is encased in said outer insulation member, wherein said anode terminal has a predetermined section, all surfaces of the predetermined section consisting of a front surface, a back surface and edges connecting between said front surface and said back surface wherein said front surface includes a connection area with said anode lead wire being connected at said connection area while being not connected to said anode terminal other than at said connection area, wherein all surfaces of said predetermined section except for said connection area are covered with a mask layer comprising a second resin, said first resin and said second resin being different from each other in at least one of composition, contents of inclusions, sizes of inclusions and shapes of inclusions.

2. The solid electrolytic capacitor of claim 1, wherein:
said mask layer has a contact angle of water droplets not smaller than 80 degrees.

3. The solid electrolytic capacitor of claim 2, wherein:
said mask layer has a contact angle of water droplets not smaller than 85 degrees.

4. The solid electrolytic capacitor of claim 3, wherein:
said mask layer has a contact angle of water droplets not smaller than 90 degrees.

5. The solid electrolytic capacitor of claim 1, wherein:
said anode terminal includes a first portion, a second portion and a coupling portion coupling said first portion and said second portion;
said second portion is fixed to a circuit board when said solid electrolytic capacitor is mounted on said circuit board;
said first portion is provided with said predetermined section; and
said mask layer completely covers said first portion except for said connection area.

6. The solid electrolytic capacitor of claim 5, wherein said mask layer covers, at least in part, said coupling portion.

7. The solid electrolytic capacitor of claim 1, wherein said mask layer covers at least a portion of said anode lead wire.

8. The solid electrolytic capacitor as recited in claim 1, wherein said mask layer covers at least a portion of said capacitor element, part of said anode terminal and part of said cathode terminal.

9. The solid electrolytic capacitor as recited in claim 1, wherein:
said anode body and said anode lead wire are made of tantalum; and
said anode terminal is formed of a copper plate plated with at least one of nickel and tin.

10. The solid electrolytic capacitor as recited in claim 1, wherein said second resin is made of silicone or fluoroplastic.

11. The solid electrolytic capacitor as recited in claim 1, wherein said capacitor element further includes a solid electrolyte layer made of conductive polymer.

12. A method for forming a capacitor comprising:
providing an anode with a dielectric thereon and an anode lead wire extending therefrom;
providing an anode terminal comprising a first portion, a second portion and a coupling portion;
attaching said anode lead wire to said first portion at a connection area;
encasing at least a portion of said anode terminal with a mask layer comprising a second resin;
encasing said capacitor with a first resin wherein said first resin and said second resin differ by at least one of composition, contents of inclusions, sizes of inclusions and shapes of inclusions;
said anode terminal includes a first portion, a second portion and a coupling portion coupling said first portion and said second portion;
fixing said second portion to a circuit board; and
said mask layer completely covers said first portion except for said connection area.

13. The method for forming capacitor of claim 12, wherein:
said mask layer has a contact angle of water droplets not smaller than 80 degrees.

14. The method for forming capacitor of claim 13, wherein:
said mask layer has a contact angle of water droplets not smaller than 85 degrees.

15. The method for forming capacitor of claim 14, wherein:
said mask layer has a contact angle of water droplets not smaller than 90 degrees.

16. The method for forming capacitor of claim 12 further comprising covering at least in part of said coupling portion with said mask layer.

17. The method for forming capacitor of claim 12, further comprising covering at least a portion of said anode lead wire with said mask layer.

18. The method for forming capacitor as recited in claim 12, wherein said mask layer covers at least a portion of said capacitor element, part of said anode terminal and part of said cathode terminal.

19. The method for forming capacitor as recited in claim 12, wherein:
said anode body and said anode lead wire are made of tantalum; and
said anode terminal is formed of a copper plate plated with at least one of nickel and tin.

20. The method for forming capacitor as recited in claim 12, wherein said second resin is made of silicone or fluoroplastic.

21. The method for forming capacitor as recited in claim 12, wherein said capacitor element further includes a solid electrolyte layer made of conductive polymer.

22. A method for forming a capacitor comprising:
providing an anode with a dielectric thereon and an anode lead wire extending therefrom;
providing an anode terminal comprising a first portion, a second portion and a coupling portion coupling said first portion and said second portion, said first portion being provided with a predetermined section, all surfaces of the predetermined section consisting of a front surface, a back surface and edges connecting between said front surface and said back surface, said front surface including a connection area with said anode lead wire being connected at said connection area while being not connected to said anode terminal other than at said connection area;
attaching said anode lead wire to said first portion at a connection area;
encasing all surfaces of said predetermined section except for said connection area with a mask layer comprising a second resin; and
encasing said capacitor with a first resin wherein said first resin and said second resin differ by at least one of composition, contents of inclusions, sizes of inclusions and shapes of inclusions.

* * * * *